United States Patent
Maram et al.

(10) Patent No.: US 7,502,154 B2
(45) Date of Patent: Mar. 10, 2009

(54) SPATIAL LIGHT MODULATOR ALIGNMENT

(75) Inventors: Jonathan M. Maram, Agoura Hills, CA (US); Jeffrey H. Hunt, Thousand Oaks, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/830,266

(22) Filed: Jul. 30, 2007

(65) Prior Publication Data

US 2007/0268548 A1     Nov. 22, 2007

Related U.S. Application Data

(62) Division of application No. 11/089,203, filed on Mar. 23, 2005, now Pat. No. 7,251,068.

(51) Int. Cl.
*G02B 26/00* (2006.01)
*G02B 7/02* (2006.01)

(52) U.S. Cl. .................................. 359/239; 359/822
(58) Field of Classification Search ............... 359/239, 359/822–824

See application file for complete search history.

(56) References Cited

U.S. PATENT DOCUMENTS

| | | | |
|---|---|---|---|
| 7,116,626 B1 * | 10/2006 | Woods et al. | 369/103 |
| 7,154,658 B2 | 12/2006 | Maram et al. | |
| 7,203,210 B2 | 4/2007 | Sox et al. | |
| 7,251,068 B2 | 7/2007 | Maram et al. | |
| 7,283,291 B2 | 10/2007 | Maram et al. | |
| 2004/0147808 A1 | 7/2004 | MacAulay et al. | |
| 2005/0068612 A1 | 3/2005 | Wilson et al. | |
| 2005/0179979 A1 | 8/2005 | Martin et al. | |
| 2006/0022115 A1 | 2/2006 | Byren | |

* cited by examiner

*Primary Examiner*—William C Choi
(74) *Attorney, Agent, or Firm*—MacPherson Kwok Chen & Heid LLP; Brent A. Folsom

(57) ABSTRACT

A method and system for aligning a spatial light modulator with respect to an imaging device is disclosed. An image of the spatial light modulator can be formed upon the imaging device and a controller can be used to position optical elements in a manner that effects translation, rotation, and scaling of the image so as to provide desired alignment. Such alignment can, for example, facilitate enhanced wavefront correction so as to at least partially compensate for the detrimental effects of atmospheric distortion in such applications as optical communications, imaging, and weaponry.

20 Claims, 2 Drawing Sheets

SPATIAL LIGHT MODULATOR ALIGNMENT

CROSS-REFERENCE TO RELATED APPLICATION

This application is a Divisional of U.S. patent application Ser. No. 11/089,203, filed Mar. 23, 2005, now U.S. Pat. No. 7,251,068, issued Jul. 31, 2007, which is hereby incorporated by reference in its entirety.

TECHNICAL FIELD

The present invention relates generally to optics and, more particularly, to the alignment of a spatial light modulator with respect to an imaging device for such applications as wavefront correction.

BACKGROUND

It is often desirable to compensate for the detrimental effects of the atmosphere upon light transmitted therethrough. Phase misalignments and distortions of different portions of a light beam transmitted through the atmosphere occur because of spatial and temporal variations in the density and chemical composition of the atmosphere. These variations occur both in a cross-section (the wavefront) of the beam and along the beam's propagation direction.

More particularly, variations in the density and chemical composition of the atmosphere cause corresponding variations in the index of refraction of the atmosphere. These variations in the index of refraction cause undesirable distortion of a light beam's wavefront which tend to vary along the length of the light beam. These index of refraction variations lead to local speed of light variations, causing differences in the optical path length experienced by the light. Such distortion has detrimental effects upon light beams used in various applications, including optical communications, imaging, and weaponry.

In optical communications, atmospheric distortion can substantially limit bandwidth. In imaging, atmospheric distortion can undesirably reduce the resolution of telescopes and cameras. In directed energy weaponry, atmospheric distortion can limit the amount of power delivered within a given area on a target.

Wavefront correction can be used to compensate for atmospheric distortion. Contemporary systems for wavefront correction, particularly in high power applications, commonly use mechanical devices such as deformable mirrors. The mechanical systems are useful because the large surface areas within their active correction region are required to handle high laser powers. However, such mechanical devices tend to be undesirably bulky and heavy. Thus, they have a significantly detrimental impact upon launch and flight costs for space-based systems.

The use of spatial light modulators for wavefront correction is known. For example, a phase-only dual-frequency liquid crystal spatial light modulator can vary the phase relationships of portions of a wavefront on a pixel-by-pixel basis. In this manner, phase misalignments caused by differences in the index of refraction for the optical paths traveled by different portions of a light beam can be mitigated.

However, in order to use a spatial light modulator in such an application, its effect upon the light beam must be monitored. The amount of wavefront correction needed for each portion of the light beam tends to vary generally continuously. Thus, each pixel of the spatial light modulator needs to react generally continuously to provide the desired correction.

The light beam can be monitored to facilitate such real-time control of the spatial light modulator. That is, the relative phase relationships of the different portions of the light beam can be measured and control signals can be provided to the spatial light modulator to vary the phase delays introduced thereby on a pixel-by-pixel basis.

Such precise control of the spatial light modulator requires that a phase measurement system be capable of distinguishing the amount of phase correction applied by each pixel of the spatial light modulator. Typically, this requires that each pixel of an imaging sensor be aligned such that it receives light from a corresponding pixel of the spatial light modulator. In this manner, every pixel of the spatial light modulator can be monitored by a pixel of the phase measurement system. As a result, there is a need for a method and system for aligning a spatial light modulator with respect to an imaging device of a phase measurement system.

SUMMARY

Systems and methods are disclosed herein to provide for the alignment of a spatial light modulator with respect to an imaging device. For example, in accordance with an embodiment of the present invention, a method for aligning a spatial light modulator with respect to an imaging device comprises forming an image of the spatial light modulator upon the imaging device, determining the alignment of pixels of the spatial light modulator with respect to corresponding pixels of the imaging device, and manipulating alignment optics to enhance alignment of the pixels of the spatial light modulator with respect to corresponding pixels of the imaging device.

More specifically, in accordance with one embodiment of the present invention, an alignment system for aligning a spatial light modulator with respect to an imaging device comprises an imaging device upon which an image of the spatial light modulator can be formed, a controller for determining an alignment of pixels of the spatial light modulator with respect to corresponding pixels of the imaging device, and alignment optics for enhancing the alignment of the pixels of the spatial light modulator with respect to corresponding pixels of the imaging device.

In accordance with one aspect of the present invention, alignment comprises effecting translation, rotation, and/or scaling of an image of the spatial light modulator upon the imaging device, so as to achieve pixel-to-pixel registration of the spatial light modulator with respect to the imaging device.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

DETAILED DESCRIPTION

Figure 1:
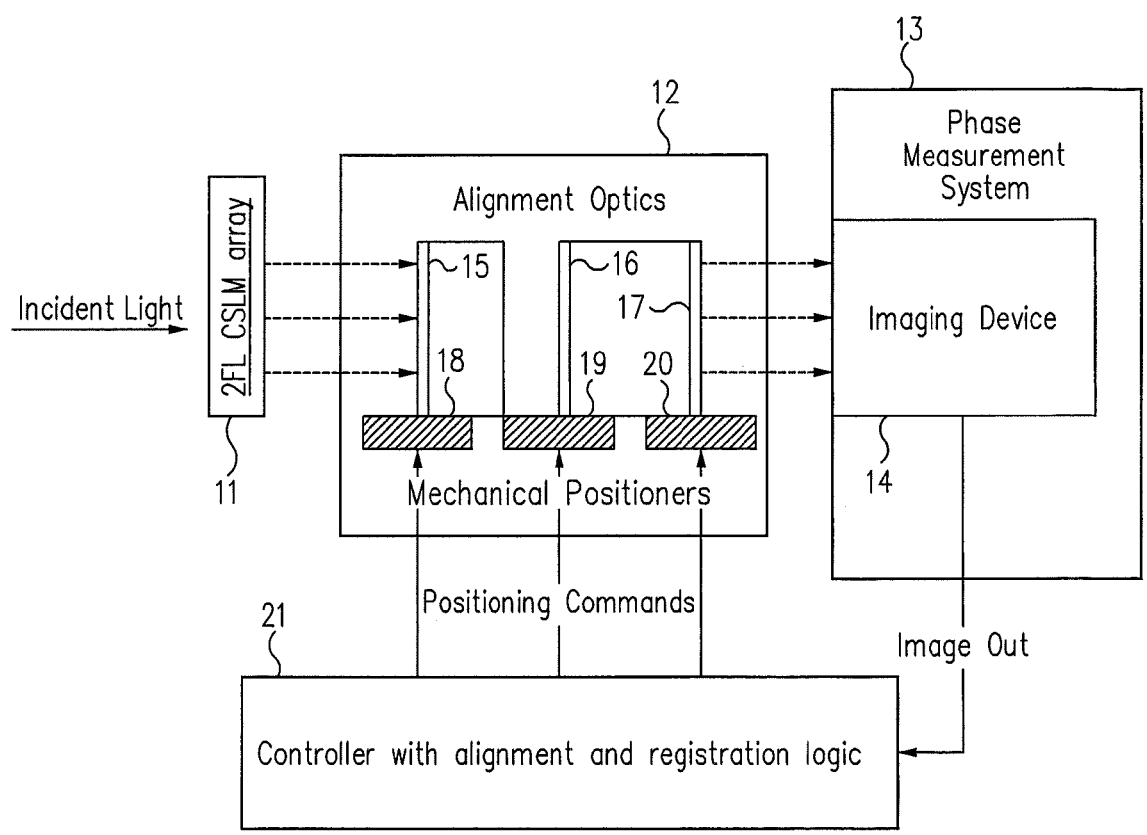
FIG. 1 shows a block diagram illustrating a spatial light modulator alignment system in accordance with an exemplary embodiment of the present invention.

FIG. 1 shows an exemplary embodiment of the spatial light modulator alignment system of the present invention. Incident light is transmitted through a spatial light modulator 11. Light transmitted through spatial light modulator 11 passes through alignment optics 12 and is incident upon an imaging device 14 of a phase measurement system 13. The phase measurement system can be used to determine the phase relationships of portions of a wavefront of a light beam to facilitate wavefront correction using the spatial light modulator according to well known principles. However, in order to perform wavefront correction effectively, spatial light modulator 11 must be aligned with respect to imaging device 14. A method and system for effecting such alignment is discussed in detail below.

During an alignment process, imaging device 14 provides an output that is representative of an image of a spatial light modulator 11. This output is provided to controller 21. Controller 21 uses alignment algorithms to control alignment optics 12 to provide desired optical alignment of spatial light modulator 11 with respect to imaging device 14. These algorithms determine the degree of misalignment and then facilitate the generation of positioning commands that are provided to electromechanical positioners 18, 19, and 20.

During wavefront correction, an imaging device provides an output that is representative of the phase relationships of various portions of a wavefront. This output is provided to phase measurement system 13 and is used for wavefront correction.

More particularly, controller 21 comprises alignment and registration logic that controls the movement of electromechanical positioners 18, 19, and 20 of alignment optics 12. Electromechanical positioners 18, 19, and 20 move optical elements 15, 16, and 17 so as to effect alignment of spatial light modulator 11 with imaging device 14.

Spatial light modulator 11 can be a phase-only, dual frequency, liquid crystal spatial light modulator. As those skilled in the art will appreciate, such dual frequency spatial light modulators have comparatively fast response rates, particularly when compared to traditional nematic spatial light modulators. The fast response rate is desirable due to the rapidly varying nature of atmospheric distortion and the speed required in order for wavefront correction to be effective. However, those skilled in the art will appreciate that other types of spatial light modulators may be used, at least in some applications.

Optical elements 15, 16, and 17 of alignment optics 12 can comprises lenses, diffraction gratings, prisms, optical fiber bundles, and any other desired items that facilitate optical alignment of spatial light modulator 11 with respect to imaging device 14. More particularly, optical element 15, 16, and 17 can comprise devices that can independently vary the translation, rotation, and scaling of an image of spatial light modulator 11 formed upon imaging device 14.

As those skilled in the art will appreciate, translation of the image can be accomplished with lenses, diffraction gratings, optical fiber bundles, and/or prisms. Rotation of the image can be accomplished by twisting an optical fiber bundle that carries an image of spatial light modulator 11. Scaling or magnification of the image can be accomplished by moving one or more lenses.

Alternatively, translation, rotation, and/or scaling of the image can be accomplished by moving spatial light modulator 11 and/or imaging device 14. For example, translation of the image can be accomplished by moving spatial light modulator 11 laterally with respect to the optical axis of the incident light, rotation of the image can be accomplished by rotating spatial light modulator 11 about the optical axis of the incident light, and scaling can be accomplished by moving spatial light modulator 11 along the optical axis of incident light.

Electromechanical positioners 18, 19, and 20 can comprise motors, piezoelectric positioners, electrostatic positioners, MEMS positioners (such as comb drives), or any other desired types of positioners. The mechanical positions can comprise either linear or rotary devices and can provide for either linear or rotary movement of optical elements 15, 16, and 17.

Imaging device 14 can comprise either an electronic device, a optical device, or a combination electronic and optical devices. For example, imaging device 14 can comprise an imager having pixels that convert incident light into electrical signals representative of the intensity of light incident thereon. When the conversion of light to an electrical signal representative thereof is performed sufficiently fast, an electronic waveform that corresponds to the waveform of light is generated. The intensity (amplitude) of this signal defines the image data that can be used by controller 21 to effect alignment.

This waveform can be compared to a reference signal to obtain phase information of the incident light for wavefront correction. Alternatively, an imaging device can comprise an all optical device wherein light incident upon each pixel is compared to reference light to obtain phase information for wavefront correction. In either instance, a phase image comprised of phase information for each pixel of spatial light modulator 11 is provided for use in wavefront correction.

Phase measurement system 13 comprises support electronics needed for the operation of imaging device 14, a reference source or sources for imaging device 14, and electronics to provide an electrical output that corresponds to the intensity, as well as the phase, of each pixel with respect to the reference(s).

Pixel-to-pixel registration between spatial light modulator 11 and imaging device 14 is obtained by processing the intensity image. The intensity image is processed to determine the position and scaling of the image of spatial light modulator 11 upon imaging detector 14. More particularly, the intensity image is processed to determine the translation, rotation, and scaling needed to bring the image of spatial light modulator 11 into desired alignment with respect to imaging device 14.

Spatial light modulator 11 can have the same number of pixels as imaging device 14. In this instance, there is a one-to-one alignment correspondence between the pixels of spatial light modulator 11 and imaging device 14. That is, each pixel of spatial light modulator 11 is aligned to a single dedicated pixel of imaging device 14.

However, spatial light modulator 11 may alternatively have either more or fewer pixels than imaging device 14. In such instances, there can be a one-to- many or a many-to-one alignment correspondence between pixels of spatial light modulator 11 and imaging device 14. Thus, each pixel of spatial light modulator 11 can be aligned to a dedicated group of pixels of imaging device 14 or a group of pixels of spatial light modulator 11 can be aligned to a single dedicated pixel of imaging device 14.

As a further alternative, when there are either more or fewer pixels in spatial light modulator 11 than in imaging device 14, only a portion of the pixels of the device with the most pixels can be used, so as to provide a one-to-one correspondence between the pixels that are used. That is, the excess pixels of either spatial light modulator 11 or imaging device 14 can be unused for the alignment process. Although pixels may be unused for the alignment process, then can still be used for wavefront correction.

Figure 2:
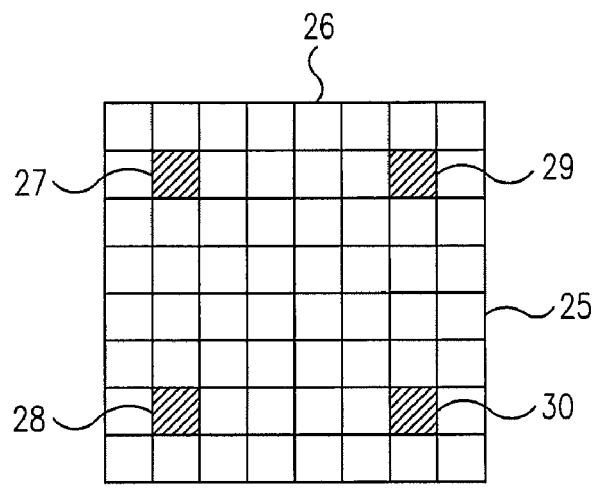
FIG. 2 shows an exemplary pattern formed by pixels of the spatial light modulator of FIG. 1 to facilitate alignment thereof.

FIG. 2 shows an exemplary intensity image of spatial light modulator 11 upon imaging device 14 that illustrates how alignment processing can be accomplished. According to this example, spatial light modulator 11 modulates light to provide an image of four index points 27-30. That is, spatial light modulator 11 is configured such that light passes though the pixels of index points 27-30 of spatial light modulator 11 and does not pass though any other pixels (such as pixels 25 and 26) of spatial light modulator 11.

Alternatively, light could be blocked by index points 27-30 and could pass though all other pixels (such as pixels 25 and 26) of spatial light modulator 11. Indeed, those skilled in the art will appreciate that various other such combinations of index points or test patterns could similarly be utilized.

Further, although four index points 27-30 are shown in FIG. 2 and discussed herein, those skilled in the art will appreciate that only two such index points are necessary. Thus, the use of four index points is by way of example only, and not by way of limitation. Any number of index points greater than one may be used to effect alignment in translation, rotation, and scaling. Indeed, a single index point may be used on some occasions, when more limited alignment is adequate. However, the use of four index points, each located proximate a corner of the spatial light modulator, will generally provide the good results.

Thus, four index points 27-30 can be projected by alignment optics 12 upon the pixels of imaging device 14. If index points 27-30 are projected solely upon the corresponding pixels of imaging device 14 with respect to the pixels of spatial light modulator 11, then proper alignment is indicated and controller 21 does not communicate any positioning commands to electromechanical positioners 18, 19, and/or 20.

However, if index points 27-30 are not projected upon the solely upon the corresponding pixels of imaging device 14, then alignment and registration logic of controller 21 determines how optical elements 15, 16, and/or 16 can be moved so as to effect proper alignment and generates positioning commands to electromechanical positioners 18, 19, and/or 20 in order to effect such alignment, according to well known principles. For example, if each of index points 27-30 are projected onto the pixels just to the right of the desired pixels, then controller 21 generates commands to electromechanical positioners 18, 19, and/or 20 to effect movement of index points 27-30 by one pixel to the left. In this fashion, alignment optics translates, rotates, and/or scales the image of spatial light modulator 11 upon imaging device 14 to obtain pixel-to-pixel registration of spatial light modulator 11 with respect to imaging device 14.

The light directed to imaging device 14 can be split or otherwise sampled from a light beam that has passed through spatial light modulator 11 and is used for communications, imaging, or weaponry. In this manner, wavefront correction can be used to substantially compensate for atmospheric distortion.

Figure 3:
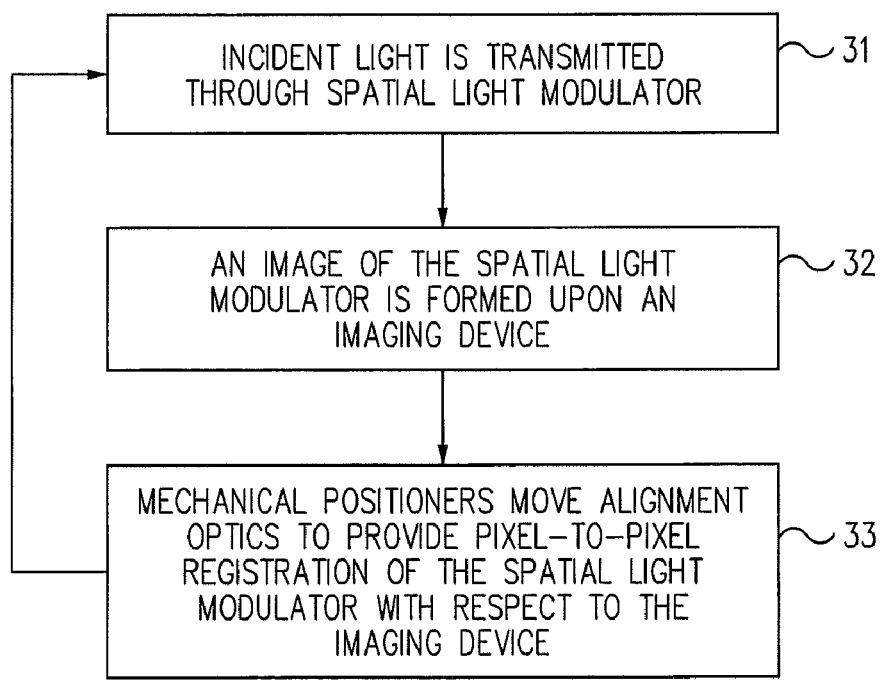
FIG. 3 shows a flow chart illustrating the operation of the spatial light modulator alignment system of FIG. 1 in accordance with an exemplary embodiment of the present invention.

FIG. 3 is a flow chart showing the process for aligning spatial light modulator 11 to imaging device 13. Incident light is transmitted through spatial light modulator 11 as indicated in block 31 and an image of spatial light modulator 11 is formed upon imaging device 14 as indicated in block 32. Electromechanical positioners 18, 19, and/or 20 move alignment optics 12 so as to provide pixel-to-pixel registration between spatial light modulator 11 and imaging optics 14, as indicated in block 33. This process is repeated until desired alignment is achieved and can be performed periodically so as to assured continued alignment.

At least some aspects of the alignment system and method of the present invention are suitable for use in low power applications. Similarly, at least some aspects of the alignment system and method of the present invention are suitable for use in high power applications. Further, at least some embodiments of the alignment system and method provide high speed wavefront control with a comparatively lightweight and compact apparatus.

Embodiments described above illustrate but do not limit the invention. It should also be understood that numerous modifications and variations are possible in accordance with the principles of the present invention. Accordingly, the scope of the invention is defined only by the following claims.

We claim:

1. An alignment system for aligning a spatial light modulator with respect to an imaging device, the alignment system comprising:
    an imaging device upon which an image of the spatial light modulator can be formed;
    a controller for determining an alignment of pixels of the spatial light modulator with respect to corresponding pixels of the imaging device; and
    alignment optics for enhancing the alignment of the pixels of the spatial light modulator with respect to corresponding pixels of the imaging device, wherein the spatial light modulator comprises a phase-only spatial light modulator.

2. The alignment system as recited in claim 1, wherein the spatial light modulator comprises a dual frequency liquid crystal spatial light modulator.

3. The alignment system as recited in claim 1, wherein the spatial light modulator has the same number of pixels as the imaging device.

4. The alignment system as recited in claim 1, wherein the spatial light modulator has more pixels than the imaging device.

5. The alignment system as recited in claim 1, wherein the spatial light modulator has less pixels than the imaging device.

6. The alignment system as recited in claim 1, wherein the controller is configured to determine the alignment of selected pixels of the spatial light modulator with respect to corresponding pixels of the imaging device.

7. The alignment system as recited in claim 1, wherein the alignment optics are configured to manipulate optical elements to vary translation of the image of the spatial light modulator upon the imaging device.

8. The alignment system as recited in claim 1, wherein the alignment optics are configured to manipulate optical elements to vary rotation of the image of the spatial light modulator upon the imaging device.

9. The alignment system as recited in claim 1, wherein the alignment optics are configured to manipulate optical elements to vary scaling of the image of the spatial light modulator upon the imaging device.

10. The alignment system as recited in claim 1, wherein the alignment optics are configured to manipulate optical elements to vary translation, rotation, and scaling of the image of the spatial light modulator upon the imaging device.

11. The alignment system as recited in claim 1, wherein the alignment optics are configured to manipulate at least one lens to vary translation, rotation, and/or scaling of the image of the spatial light modulator upon the imaging device.

12. The alignment system as recited in claim 1, wherein the alignment optics are configured to manipulate at least one diffraction grating to vary translation, rotation, and/or scaling of the image of the spatial light modulator upon the imaging device.

13. The alignment system as recited in claim 1, wherein the alignment optics are configured to manipulate at least one optical fiber bundle to vary translation, rotation, and/or scaling of the image of the spatial light modulator upon the imaging device.

14. The alignment system as recited in claim 1, wherein the alignment optics are configured to manipulate at least one prism to vary translation, rotation, and/or scaling of the image of the spatial light modulator upon the imaging device.

15. The alignment system as recited in claim 1, wherein the alignment optics comprise motors configured to move optical elements.

16. The alignment system as recited in claim 1, wherein the alignment optics comprise piezoelectric positioners configured to move optical elements.

17. The alignment system as recited in claim 1, wherein the alignment optics comprise MEMS positioners configured to move optical elements.

18. An alignment system for aligning a spatial light modulator with respect to an imaging device, the alignment system comprising:
   an imaging device upon which an image of the spatial light modulator can be formed;
   a controller for determining an alignment of pixels of the spatial light modulator with respect to corresponding pixels of the imaging device; and
   alignment optics for enhancing the alignment of the pixels of the spatial light modulator with respect to corresponding pixels of the imaging device, wherein the alignment optics are configured to manipulate at least one diffraction grating to vary translation, rotation, and/or scaling of the image of the spatial light modulator upon the imaging device.

19. An alignment system for aligning a spatial light modulator with respect to an imaging device, the alignment system comprising:
   an imaging device upon which an image of the spatial light modulator can be formed;
   a controller for determining an alignment of pixels of the spatial light modulator with respect to corresponding pixels of the imaging device; and
   alignment optics for enhancing the alignment of the pixels of the spatial light modulator with respect to corresponding pixels of the imaging device, wherein the alignment optics are configured to manipulate at least one optical fiber bundle to vary translation, rotation, and/or scaling of the image of the spatial light modulator upon the imaging device.

20. An alignment system for aligning a spatial light modulator with respect to an imaging device, the alignment system comprising:
   an imaging device upon which an image of the spatial light modulator can be formed;
   a controller for determining an alignment of pixels of the spatial light modulator with respect to corresponding pixels of the imaging device; and
   alignment optics for enhancing the alignment of the pixels of the spatial light modulator with respect to corresponding pixels of the imaging device, wherein the alignment optics are configured to manipulate at least one prism to vary translation, rotation, and/or scaling of the image of the spatial light modulator upon the imaging device.

* * * * *